(12) United States Patent
Tsukagoshi et al.

(10) Patent No.: US 6,961,161 B2
(45) Date of Patent: Nov. 1, 2005

(54) HOLOGRAPHIC RECORDING AND REPRODUCING APPARATUS

(75) Inventors: Takuya Tsukagoshi, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/921,928

(22) Filed: Aug. 20, 2004

(65) Prior Publication Data
US 2005/0078342 A1   Apr. 14, 2005

(30) Foreign Application Priority Data
Aug. 27, 2003  (JP) .............................. 2003-303509

(51) Int. Cl.[7] .............................................. G03H 1/10
(52) U.S. Cl. .............................. 359/10; 359/1; 359/30; 282/260; 282/275
(58) Field of Search ............................... 359/1, 10, 21, 359/29, 30, 32; 382/210, 211, 275

(56) References Cited

U.S. PATENT DOCUMENTS 6,226,415 B1 * 5/2001 Wilson et al. .............. 382/275
2003/0048957 A1 * 3/2003 Dai et al. ................... 382/260

FOREIGN PATENT DOCUMENTS

JP  2001-291242  10/2001

* cited by examiner

Primary Examiner—Fayez G. Assaf
(74) Attorney, Agent, or Firm—Oblon, Spivak, McClelland, Maier & Neustadt, P.C.

(57) ABSTRACT

An image detected by a CCD image sensor 108 when only a non-modulated signal light is applied to a holographic memory 120 in which data is not recorded is ensured as a noise pattern. When data is reproduced, the previously obtained noise pattern is subtracted from a reproduced image detected by the CCD image sensor 108.

11 Claims, 8 Drawing Sheets

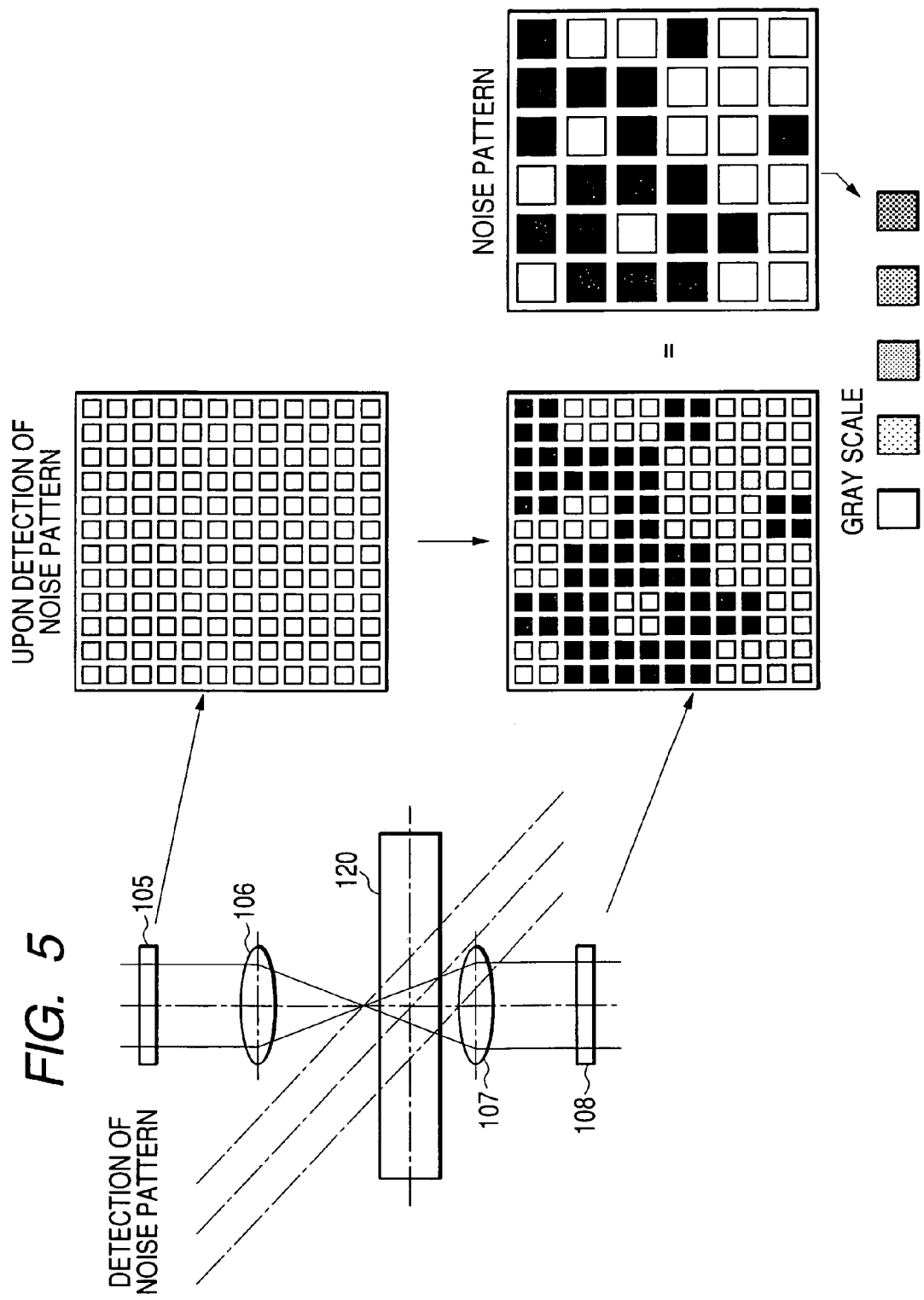

2  3  4  5  6  7

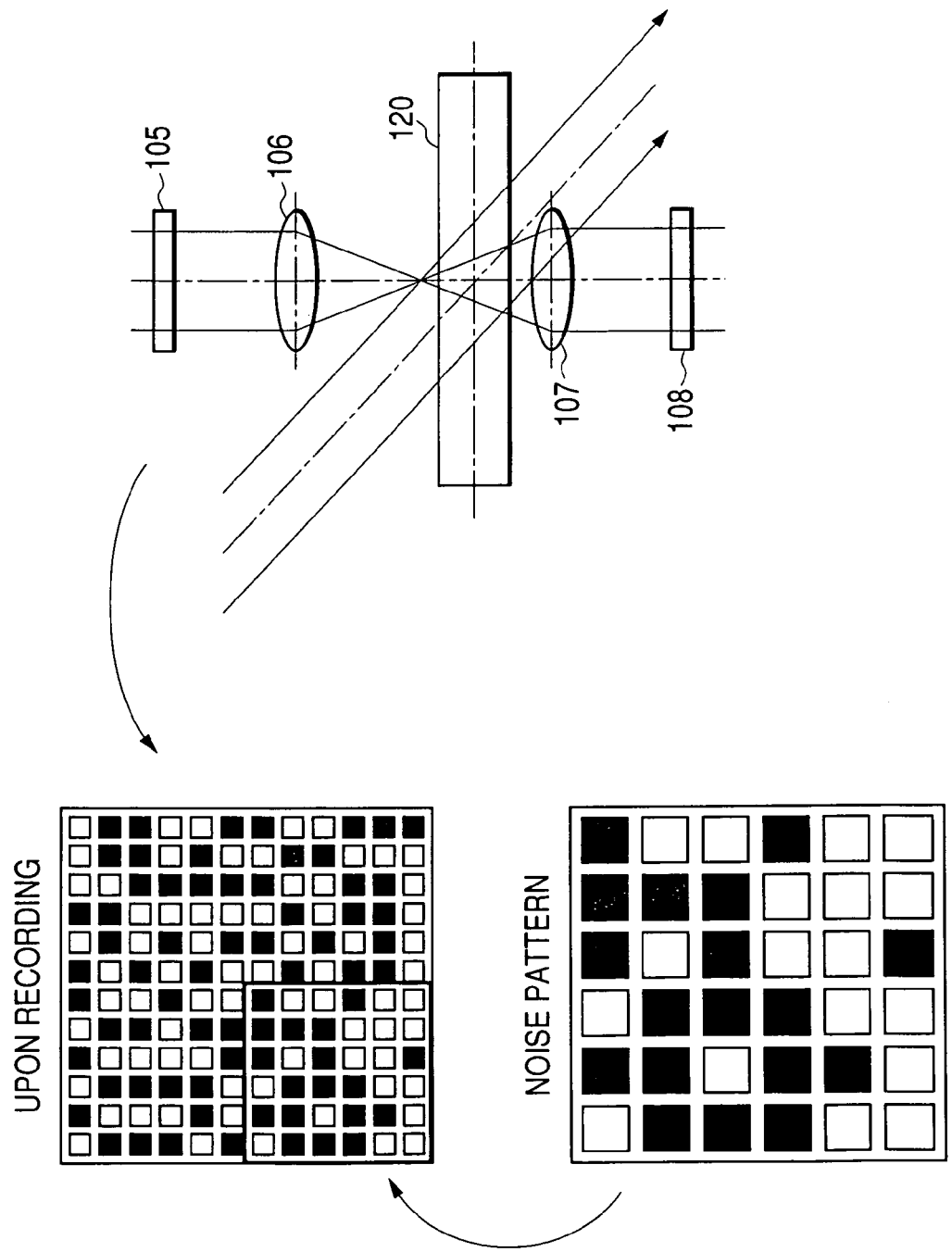

HOLOGRAPHIC RECORDING AND REPRODUCING APPARATUS

BACKGROUND OF THE INVENTION

The present invention relates to a holographic recording and reproducing apparatus, and more particularly to a holographic recording and reproducing apparatus capable of removing noise superimposed on a reproduced image upon reproducing data.

A holographic recording and reproducing apparatus that has a large capacity and can perform a high-speed recording and reproducing operation has been paid attention to. When data is recorded in the holographic recording and reproducing apparatus, a signal light spatially modulated on the basis of data to be recorded and a reference light having interference characteristics therewith are applied to a holographic memory as a recording medium so as to intersect together in the holographic memory. Thus, the data is recorded as the interference pattern of light.

The data recorded in the holographic memory in such a way is irradiated with the reference light so that the data can be reproduced. The reference light applied to a prescribed recording position (refer it to as a page, hereinafter) in which the interference pattern is formed is diffracted by a lattice of interference stripes to be formed as a reproduced image. Accordingly, the reference light as the reproduced image is detected by a light receiving unit such as a CCD image sensor to reproduce the data. According to this apparatus, since the image data recorded in the holographic memory is reproduced at a time by allowing the reference light to be incident thereon, a high-speed reproduction can be realized.

Ordinarily, since noise components are included in the data reproduced in the holographic recording and reproducing apparatus, the noise components need to be removed by any of methods. The noise components are originated from various kinds of causes such as an optical system including a light source or a lens, media itself or an input and output device including a spatial light modulator (SLM) or a charge coupled device (CCD).

As a general method for removing noise, there is a method for carrying out an image process or an error correction coding (ECC) process to the detected reproduced image or a method for assuming a common noise pattern to all pages to perform an image process. Further, a method for reducing an influence of noise resulting from a recording medium or noise due to external light is also well-known (see Patent Document 1). In this method, a light beam including an S-polarized light and a P-polarized light is polarized and split. After a signal is supplied to the S-polarized light, both the polarized lights are synthesized to apply the light beam to a hologram recording medium. During reproducing the data, the images of S and P polarized light components are independently detected to obtain a difference signal between both the images. Thus, a common noise component is removed.

[Patent Document 1] JP-A-13-291242

In the above-described usual method for removing the noise, since the S-polarized light is split from the P-polarized light, optical paths need to be respectively provided therefor so that an optical system is undesirably enlarged. Further, in the above-described method, noise caused from a spatial light modulator (SLM) provided on the optical path of the S-polarized light cannot be undesirably removed.

SUMMARY OF THE INVENTION

Accordingly, it is an object of the present invention to provide a holographic recording and reproducing apparatus capable of removing a noise component superimposed on a reproduced image with a simple structure.

The above-described object of the present invention is achieved by a holographic recording and reproducing apparatus in which a signal light and a reference light are applied to a holographic memory to record data as the interference pattern of the lights and the data is reproduced from a reproduced image obtained by applying the reference light to the holographic memory. The holographic recording and reproducing apparatus comprises: a noise pattern detecting unit for detecting a noise pattern in a prescribed page of the holographic memory; a noise pattern recording unit for recording the noise pattern on the holographic memory; a data reproducing unit for reading the reproduced image from the prescribed page of the holographic memory; and a noise removing unit for removing a noise component from the reproduced image by using the noise pattern previously detected by the noise pattern detecting unit.

Preferably, the noise pattern detecting unit may further includes a signal light applying unit for applying the non-modulated signal light to the prescribed page of the holographic memory; a light receiving unit for receiving the signal light that passes through or is reflected on the holographic memory; and a noise pattern processing unit for compressing the noise pattern from the light receiving unit.

Preferably, the noise pattern recording unit records the noise pattern detected in each page of the holographic memory in the page together with data to be originally recorded.

Preferably, the noise pattern recording unit concentrically records the noise pattern detected in each page of the holographic memory in a prescribed area of the holographic memory separately from the data to be originally recorded.

Preferably, the noise pattern detecting unit detects the noise pattern by a gray scale.

Preferably, when the noise pattern detecting unit sequentially detects the noise patterns respectively in the pages of the holographic memory, the noise pattern detecting unit detects the noise patterns at intervals of prescribed pages.

Preferably, when the data reproducing unit reproduces data on a page in which the noise pattern is not recorded, the data reproducing unit removes a noise component from the reproduced image by using a noise pattern obtained by performing an interpolating process using the noise patterns of the pages before and after the page.

Preferably, when a plurality of data is recorded in the same place by a phase code multiplex recording or a wavelength multiplex recording, the noise removing unit removes the noise component from the reproduced image by using a noise pattern common to each of the data.

As described above, according to the present invention, a holographic recording and reproducing apparatus in which a noise component superimposed on a reproduced image can be removed with a simple structure can be provided.

BRIEF DESCRIPTION OF THE DRAWINGS

FIG. 5 is a schematic view showing another example for detection of a noise pattern.

FIG. 7 is a schematic view for explaining the recording of data in a holographic memory according to other preferred embodiment of the present invention.

FIG. 8A shows a case when a phase code multiplex recording is carried out and FIG. 8B shows a case when a wavelength multiplex recording is carried out, respectively.

DETAILED DESCRIPTION OF THE PREFERRED EMBODIMENTS

Now, by referring to the accompanying drawings, preferred embodiments of the present invention will be described below in detail.

Figure 1:
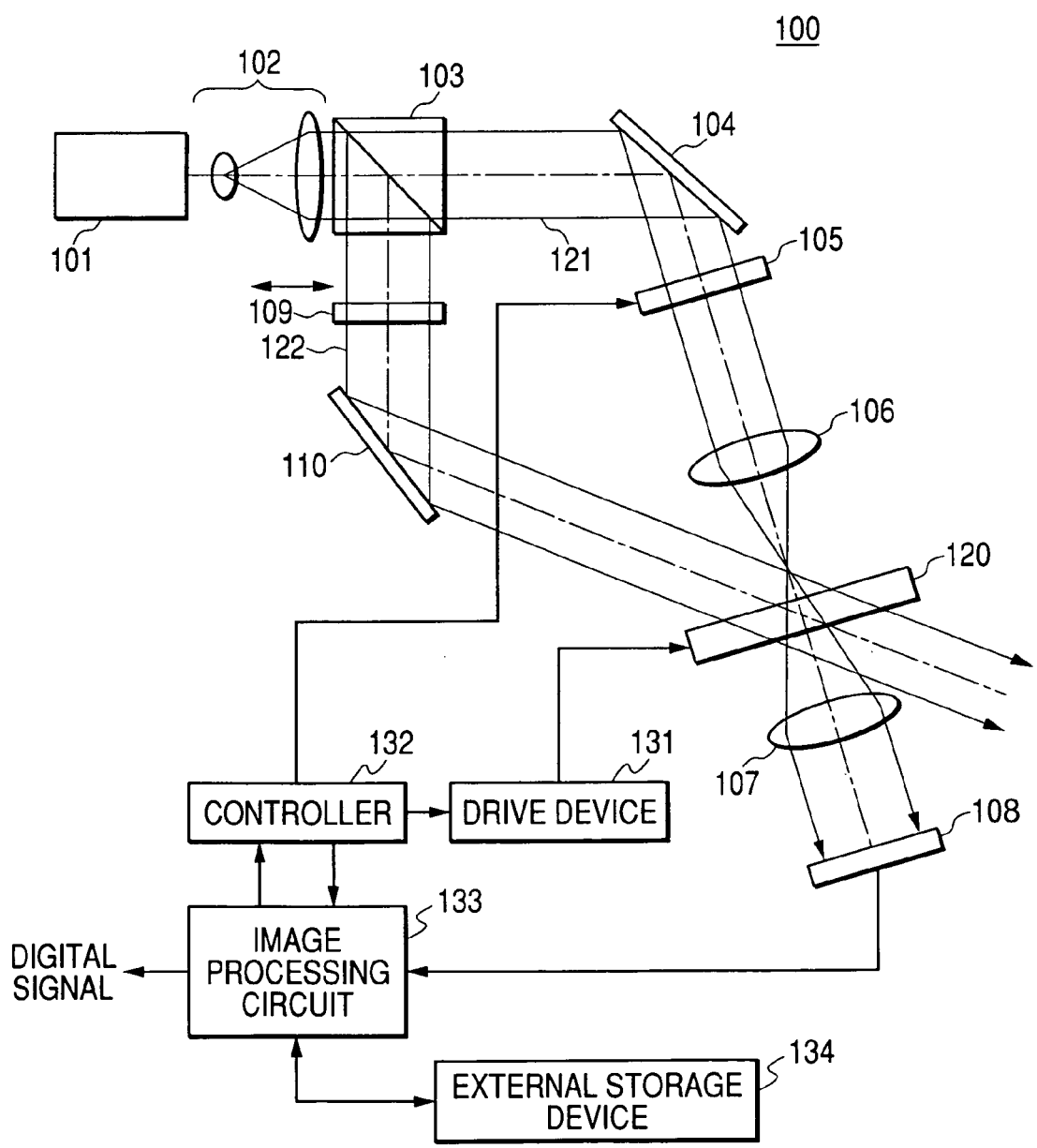
FIG. 1 is a schematic view showing the structure of a holographic recording and reproducing apparatus according to a preferred embodiment of the present invention.

FIG. 1 is a schematic view showing the structure of a holographic recording and reproducing apparatus according to a preferred embodiment of the present invention.

As shown in FIG. 1, a holographic recording and reproducing apparatus 100 is provided with a laser light source 101 for recording and reproducing data and detecting a noise pattern. As the laser light source 101, a solid laser or a gas laser with higher wavelength stability is used. In the advancing direction of a beam outgoing from the laser light source 101, a beam expander 102 and a beam splitter 103 are provided.

In the advancing direction of a signal light 121 as one beam divided by the beam splitter 103, a mirror 104 is provided. In the advancing direction of the beam reflected by the mirror 104, a spatial light modulator (SLM) 105, a Fourier transform lens 106, an inverse Fourier transform lens 107 and a CCD image sensor 108 are provided in order. Between the Fourier transform lens 106 and the inverse Fourier transform lens 107, a holographic memory 120 is arranged. In the SLM 105, many pixels are arranged in the form of a matrix and the SLM controls light to pass or to be interrupted for each of pixels. When the pixel is turned off, the light is interrupted. However, when the pixel is turned on, the light can pass. On the other hand, in the advancing direction of a reference light 122 as the other beam divided by the beam splitter 103, a shutter 109 and a mirror 110 are provided. The orientation of the mirror 110 is set so that the reference light intersects the signal light in a prescribed position in the holographic memory 120. As the holographic memory 120, a transmission type is employed.

The holographic recording and reproducing apparatus 100 further includes a driving device 131 for driving the holographic memory 120, a controller 132 for controlling the driving device 131 and the SLM 105, an image processing circuit 133 for processing a reproduced image detected by the CCD image sensor 108 to reproduce data and an external storage device 134 for recording the data.

In the holographic recording and reproducing apparatus 100 formed as described above, the noise pattern of the holographic memory 120 is detected as described below.

Figure 2:
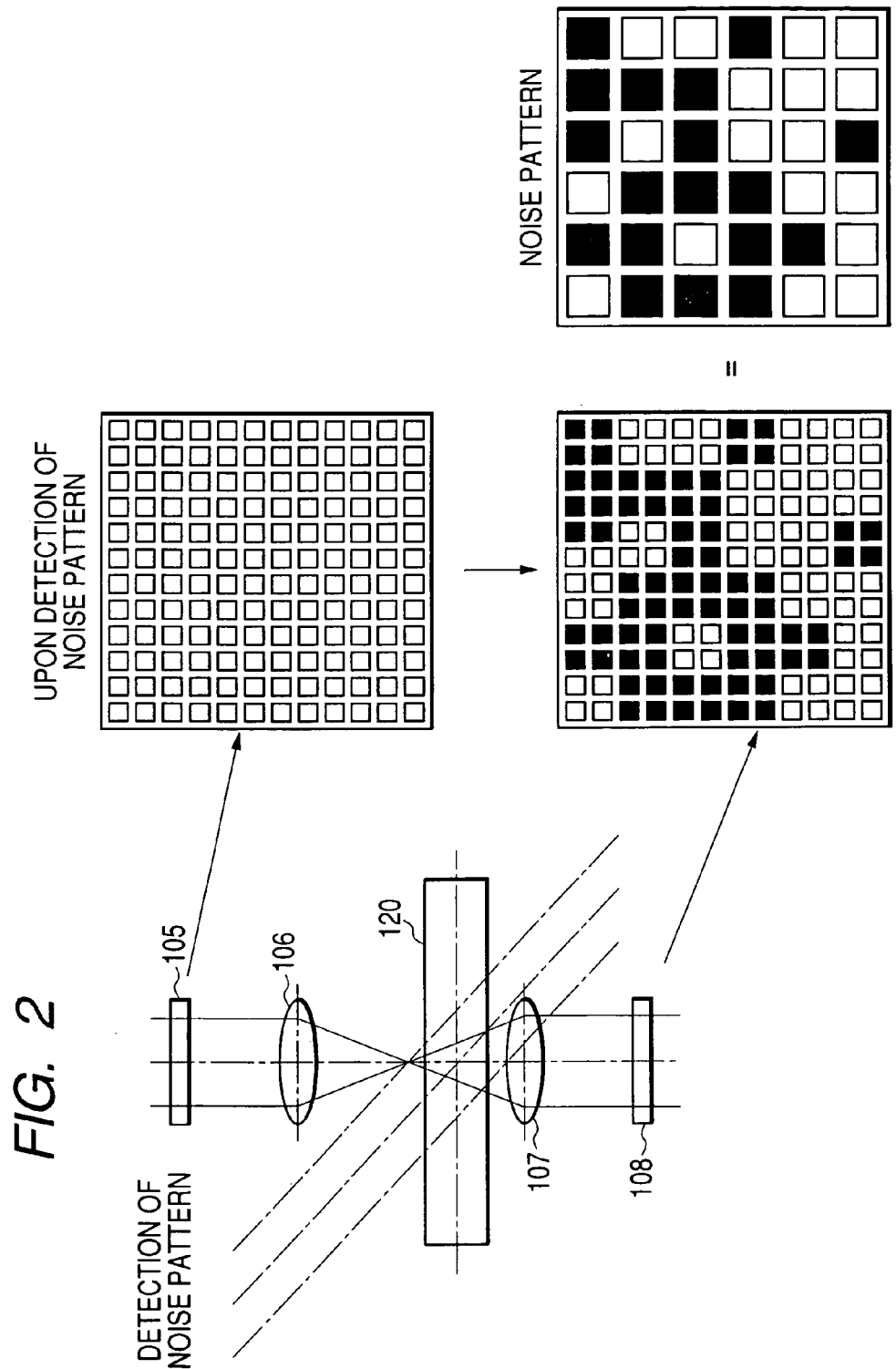
FIG. 2 is a schematic view for explaining a detection of a noise pattern in the preferred embodiment of the present invention.

FIG. 2 is a schematic view for explaining the detection of the noise pattern of a preferred embodiment of the present invention.

In the detection of the noise pattern, the shutter 109 shown in FIG. 1 is firstly previously set to ON to interrupt the reference light 122 and all the pixels of the SLM 105 are respectively set to ON so that the signal light 121 completely passes as shown in FIG. 2.

Then, the beam is applied from the laser light source 101. The laser beam whose diameter is enlarged by the beam expander 102 to be parallel lights is incident on the beam splitter 103. The beam incident on the beam splitter 103 is divided into the signal light 121 and the reference light 122. However, since the reference light 122 is interrupted by the shutter 109, only the signal light 121 is applied to the holographic memory 120. Here, since the pixels of the SLM 105 are completely set to ON, the signal light 121 is not spatially modulated and directly passes through the SLM 105, is converged by the Fourier transform lens 106 and applied to the holographic memory 120.

The beam applied onto the holographic memory 120 passes through the holographic memory 120, passes through the inverse Fourier transform lens 107 and is applied to the CCD image sensor 108.

Here, when a non-modulated signal light is applied to the holographic memory in which data is not recorded, a reproduced image having a uniform pattern without unevenness is originally detected. However, when noise exists, a pattern having unevenness as shown in FIG. 2 is detected. As described above, such a noise pattern is considered to be originated from an optical system including a light source or a lens, media itself or an input and output device including an SLM or a CCD.

The noise pattern detected by the CCD image sensor 108 is processed as an image having a lower resolution than an ordinary resolution in the image processing circuit 133. For instance, in this embodiment, a bit pattern of 2×2 dots is treated as data of one dot. Accordingly, as shown in the drawing, all the pixels of the CCD include, for instance, 12×12 dots, the noise pattern is treated as the image pattern of 6×6 dots. The noise pattern processed in the image processing circuit 133 is recorded in the external storage device 134.

Figure 3:
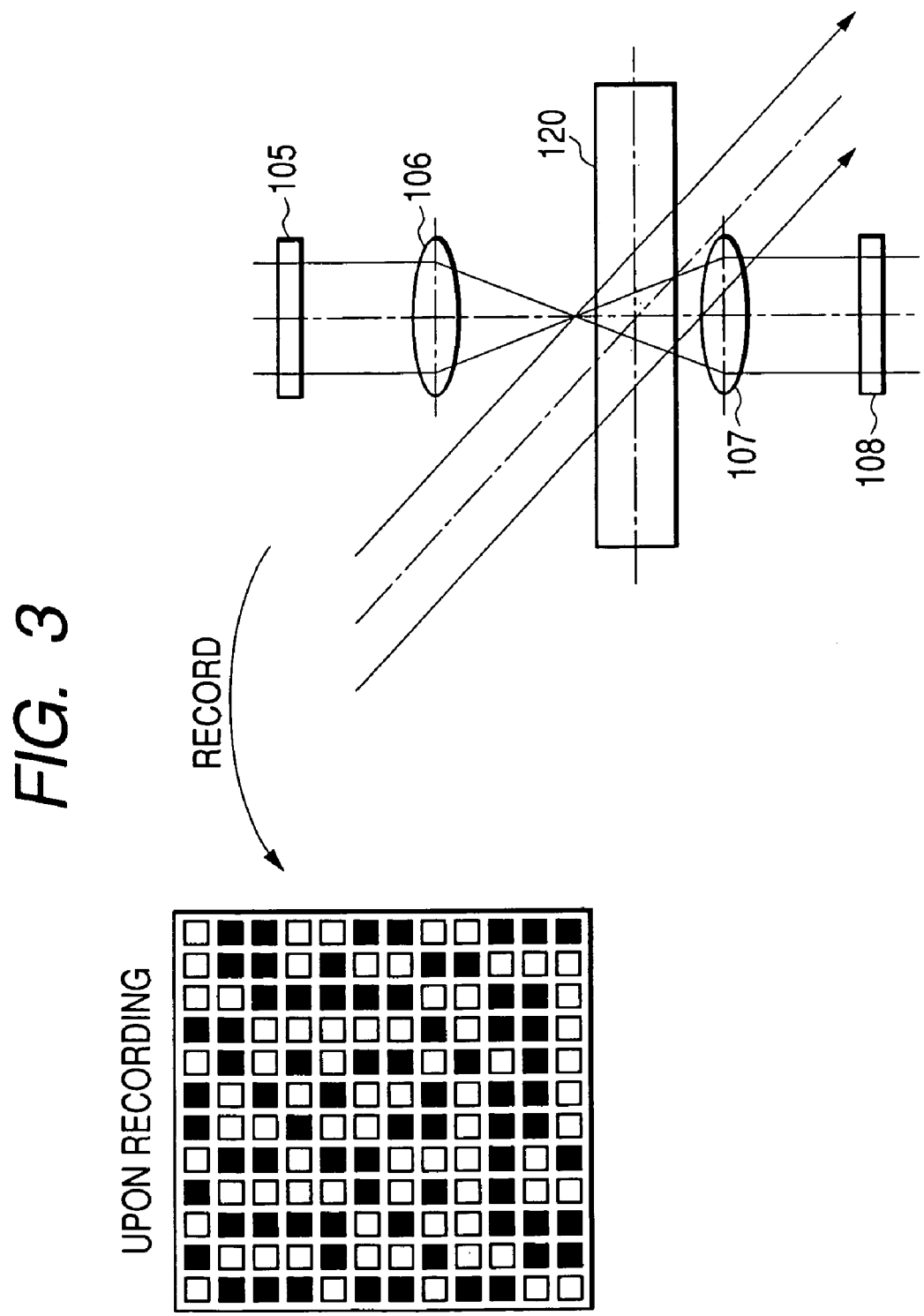
FIG. 3 is a schematic view for explaining the recording of data in a holographic memory in the preferred embodiment of the present invention.

FIG. 3 is a schematic view for explaining the recording of data on the holographic memory in the preferred embodiment of the present invention.

When the data is recorded, the shutter 109 shown in FIG. 1 is firstly previously set to OFF to enable the reference light to pass, and the pixels of the SLM 105 are respectively set to ON or OFF depending on data to be recorded as shown in FIG. 3.

Then, the beam is applied from the laser light source 101. The laser beam whose diameter is enlarged by the beam expander 102 to become parallel lights is then incident on the beam splitter 103. The beam incident on the beam splitter 103 is divided into the signal light 121 and the reference light 122. The signal light 121 is reflected on the mirror 104, passes through the SLM 105, and then, is applied to the holographic memory. At this time, the signal light 121 is spatially modulated depending on the ON and OFF of the pixels of the SLM 105. The signal light is converged by the Fourier transform lens 106 and applied to the holographic memory 120. On the other hand, the reference light 122 is also reflected on the mirror 110 and applied to the holographic memory 120. The signal light 121 intersects the reference light 122 in the holographic memory 120 to interfere with each other. Thus, interference stripes are formed in the holographic memory 120. That is, the data is recorded as the interference pattern of light.

Figure 4:
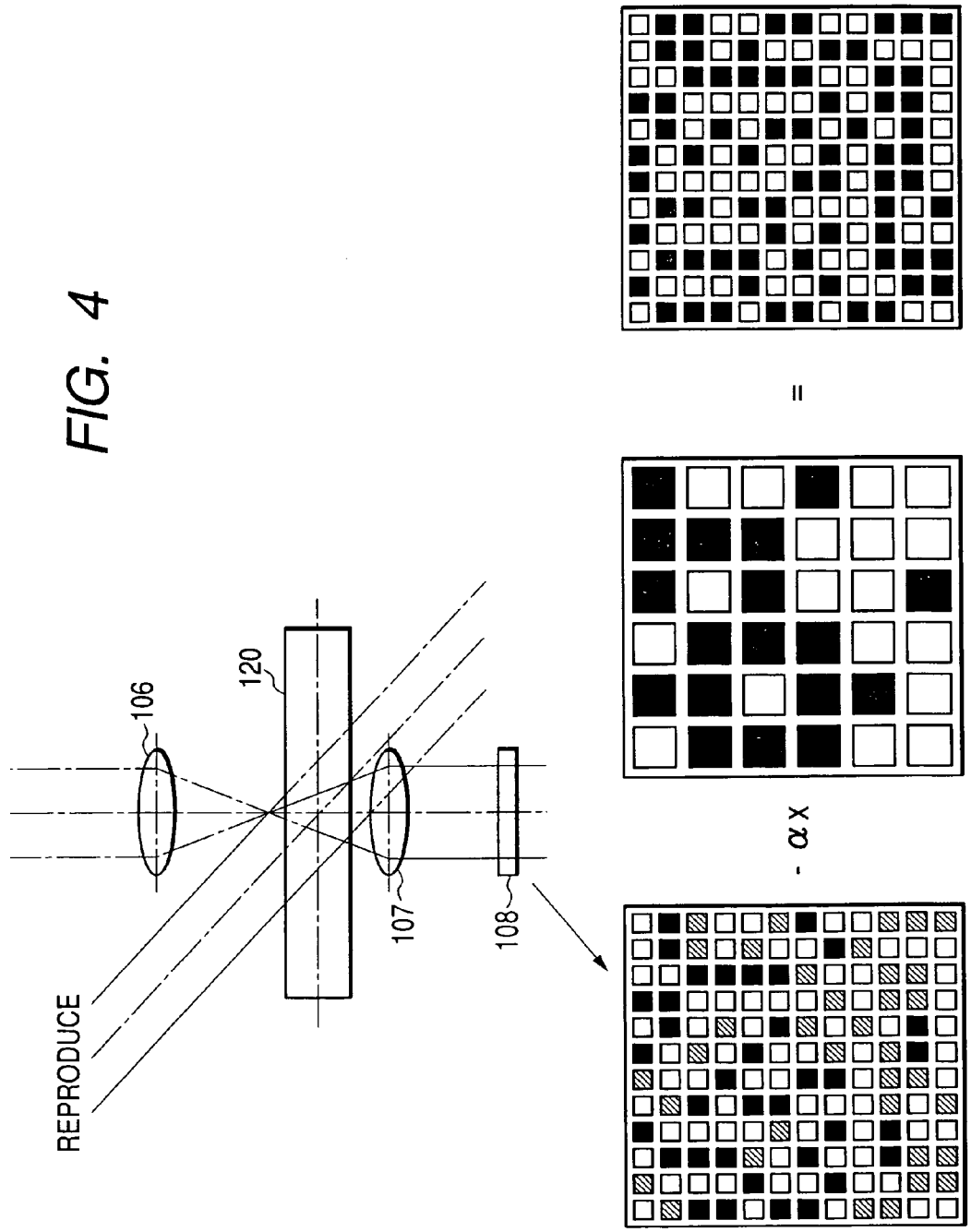
FIG. 4 is a schematic view for explaining the reproduction of data from the holographic memory in the preferred embodiment of the present invention.

FIG. 4 is a schematic view for explaining the reproduction of data from the holographic memory according to the preferred embodiment of the present invention.

When the data is reproduced, the shutter 109 shown in FIG. 1 is firstly previously set to OFF to enable the reference light to pass and all the pixels of the SLM 105 are set to OFF to interrupt the signal light.

Then, the beam is applied from the laser light source 101. The laser beam whose diameter is enlarged by the beam expander 102 to become parallel lights is then incident on the beam splitter 103. The beam incident on the beam splitter 103 is divided into the signal light 121 and the reference light 122. The signal light 121 is reflected on the mirror 104 and incident on the SLM 105. However, since all the pixels of the SLM 105 are set to OFF, the signal light 121 is interrupted by the SLM 105 and only the reference light 122 is applied to the holographic memory 120. The reference light 122 is spatially modulated like the signal light 121 by the interference pattern formed in the holographic memory 120 and diffracted in the advancing direction of the signal light 121. Accordingly, the reference light 122 passes through the inverse Fourier transform lens 107 and is applied to the CCD image sensor 108.

The reproduced image detected by the CCD image sensor 108 is processed as image data having an ordinary high resolution in the image processing circuit 133. For instance, in this embodiment, the reproduced image is treated as a pattern of 12×12 dots. On the other hand, from the external storage device, a corresponding noise pattern is read. Here, since the noise pattern is converted into the low resolution of 6×6 dots, one dot is expanded to 2×2 dots and the entire noise pattern is expanded to a resolution corresponding to 12×12 dots. Then, a noise pattern obtained by multiplying the noise pattern by a constant number (a times) is subtracted from the reproduced image detected by the CCD image sensor 108 to obtain the reproduced image with noise removed. A decoding process is carried out by using the reproduced image.

The detection of the noise pattern as described above, the record of the data and the reproduction of the data are sequentially carried out for each page unit. Finally, the detection of the noise pattern, the record of the data and the reproduction of the data are carried out for the whole part of the holographic memory.

As described above, according to this embodiment, when only the non-modulated signal light is applied to the holographic memory in which the data is not recorded, the image detected by the CCD image sensor is ensured as the noise pattern. When the data is reproduced, the previously obtained noise pattern is subtracted from the reproduced image detected by the CCD image sensor. Thus, a noise component superimposed on the reproduced image can be removed by a simple structure.

In the above-described detection of the noise pattern, the noise pattern is obtained as a binary pattern. The noise pattern may be obtained as a multi-value gray scale.

FIG. 5 is a schematic view showing another example for detecting a noise pattern.

As shown in FIG. 5, as the CCD image sensor 108, the gray scale having five stages is employed. The noise pattern of the gray scale detected by the CCD is directly recorded in the external storage device 134. Then, noise is removed from the reproduced image by using the noise pattern so that the noise can be more accurately removed.

The above-described detection of the noise pattern may be carried out for all the pages on the holographic memory 120, or may be carried out at intervals of prescribed pages. Specially, when the data is recorded by a shift multiplex recording process, the detection of the noise pattern at intervals of prescribed pages is more preferable.

Figure 6A:
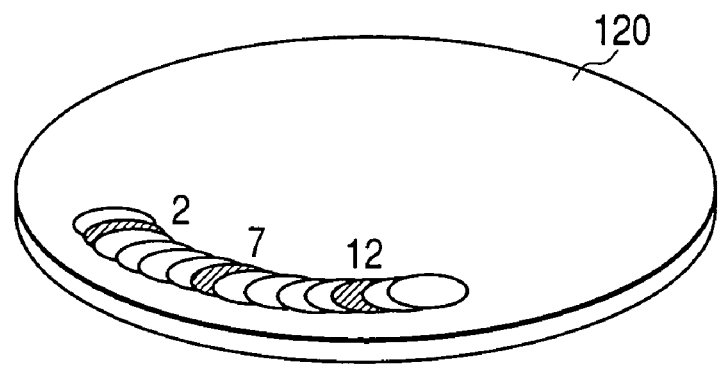
FIGS. 6A and 6B are schematic views showing one example of detecting positions of noise patterns when a shift multiplex recording process is carried out.
Figure 6B:
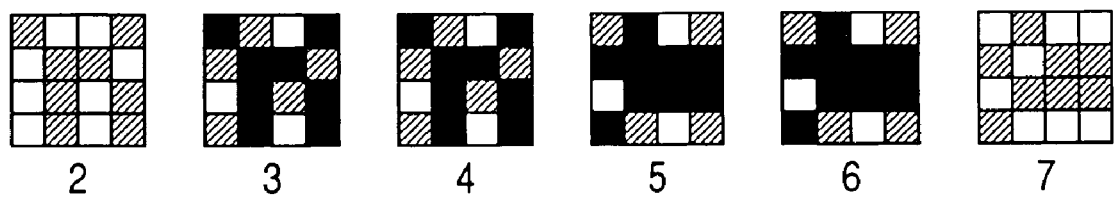

FIGS. 6A and 6B are schematic views showing one example of a detecting position of the noise pattern when the shift multiplex recording process is carried out.

As shown in FIG. 6A, in this embodiment, the noise pattern is detected once at intervals of five pages arranged so that the pages are overlapped on the holographic memory 120. Here, as shown in FIGS. 6A and 6B, the noise pattern is detected in the second page, the seventh page and the twelfth page. In such a way, a situation that the quantity of the data of the noise pattern is enormously large can be suppressed.

Further, in this case, when data recorded on a page in which the noise pattern is not detected is reproduced, noise is preferably removed from the reproduced image by using a noise pattern obtained by performing an interpolating process to the noise patterns obtained in pages before and after the page. In such a way, since the noise pattern may be anticipated to some degree to obtain a proper pattern, the noise can be removed in all the pages without obtaining the noise patterns of all pages.

Further, in the interpolating process of the noise pattern, the gray scale may be used. For instance, when the noise patterns are obtained as binary patterns in the second and seventh pages shown in FIG. 6A, the noise patterns of the third to sixth pages between them are obtained as the patterns of the gray scale by the interpolating process. In such a manner, a more accurate interpolating process can be carried out.

In the above-described embodiment, the detected noise pattern is recorded in the external storage device 134. However, the noise pattern may be recorded in media itself (the holographic memory 120) together with actual data. In this case, before the data is recorded in the holographic memory 120, the noise pattern is firstly detected as shown in FIG. 2 like a case in which the data is recorded as shown in FIG. 3. Then, the obtained noise pattern is recorded and the data is recorded.

FIG. 7 is a schematic view for explaining a recording process of data in a holographic memory according to other preferred embodiment of the present invention.

When the data is recorded, the shutter 109 shown in FIG. 1 is firstly previously set to OFF to enable reference light to pass, and the pixels of an SLM 105 are respectively set to ON or OFF depending on data to be recorded as shown in FIG. 7. Here, in this embodiment, a noise pattern detected in a page is recorded as well as actual data to be originally recorded. In this embodiment, while all the pixels of the SLM have 12×12 dots, the noise pattern has 6×6 dots. The noise pattern occupies ¼ as large as the entire part of the recorded data. For instance, the pixels of the SLM are respectively set so that the noise pattern is recorded in 6×6 dots of a right lower part and the actual data is recorded in a remaining area.

Then, a beam is applied from a laser light source. The laser beam whose excessive quantity of light is removed by an ND filter and whose diameter is enlarged by a beam expander to become parallel lights is then reflected on a mirror and incident on a beam splitter. The beam incident on the beam splitter is divided into a signal light and a reference light. The signal light passes through the SLM, and then, is applied to the holographic memory. At this time, the signal light is spatially modulated depending on the ON and OFF of the pixels of the SLM. The signal light is converged by a Fourier transform lens and applied to the holographic memory. On the other hand, the reference light is also reflected on two mirrors and applied to the holographic memory. The signal light intersects the reference light in the recording layer of the holographic memory to interfere with each other. Thus, interference stripes are formed in the recording layer of the holographic memory. That is, the data and the noise pattern are recorded as the interference pattern of light.

When the data is reproduced, the reference light is applied to detect a reproduced image as described by referring to FIG. 4. Since the noise pattern is included in the reproduced image, the noise pattern is initially taken out from the reproduced image. Then, a noise pattern obtained by multiplying the noise pattern by a constant number (α times) is subtracted from the reproduced image detected by a CCD image sensor 108 to obtain the reproduced image with noise removed. A decoding process is carried out by using the reproduced image.

As described above, according to this embodiment, since the noise pattern on the prescribed page is recorded as well as the data to be actually recorded in the prescribed page, an external storage device having a large capacity is not required.

When the noise pattern is recorded in media, the quantity of data of the noise pattern is preferably reduced as much as possible. Accordingly, in this case, the noise patterns of all pages are not detected, nor recorded, and the noise patterns are preferably detected at intervals of prescribed pages as shown in FIG. 6A. Further, as shown in FIG. 6B, when the data recorded on a page in which the noise pattern is not detected, the noise is preferably removed from the reproduced image by using a noise pattern obtained by performing an interpolating process to the noise patterns obtained in pages before and after the page. When a shift multiplex recording process is carried out, the noise pattern does not need to be recorded on the page in which the noise pattern is not detected. Accordingly, the more data can be recorded for the part in which the noise pattern is not recorded.

Figure 8A:
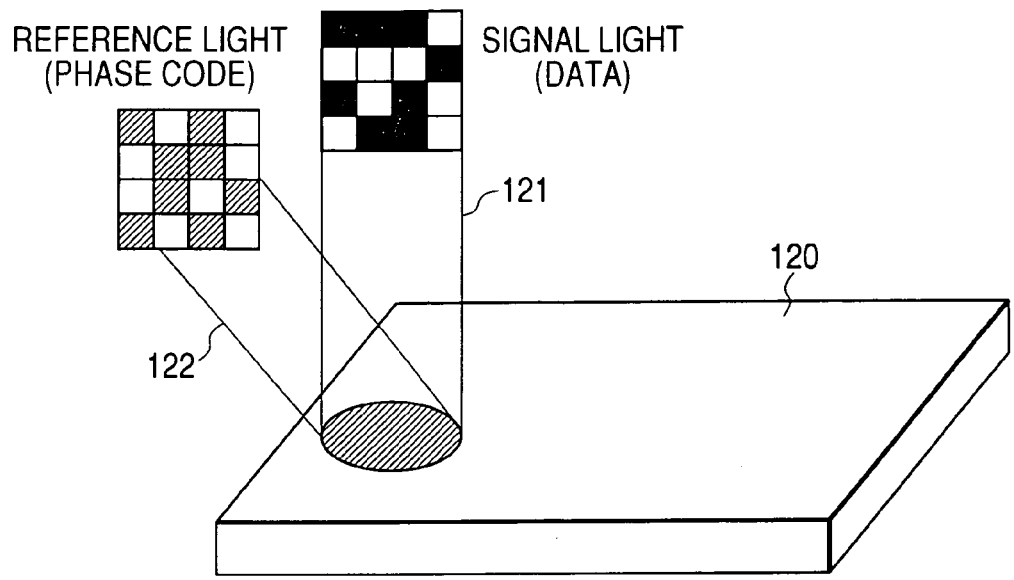
FIGS. 8A and 8B are schematic views for explaining examples that a multiplex recording process is carried out at the same position on the holographic memory, particularly.
Figure 8B:
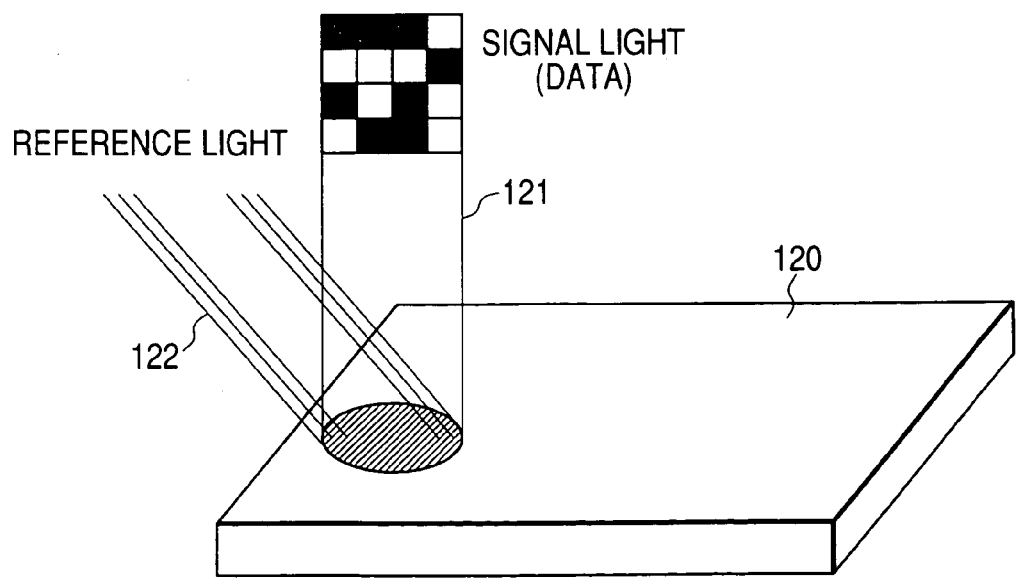

FIGS. 8A and 8B are schematic views for explaining examples that a multiplex recording process is performed on the same positions on the holographic memory. FIG. 8A shows a case that a phase code multiplex recording is carried out and FIG. 8B shows a case that a wavelength multiplex recording is carried out, respectively.

As shown in FIG. 8A, in the case of the phase code multiplex recording, since the data is recorded a plurality of times by changing a phase code in the same position, one noise pattern can be shared for the phase code multiplex recording at the same position. Further, as shown in FIG. 8B, in the case of the wavelength multiplex recording, since the wavelength is changed and different data is recorded at the same position, one noise pattern can be shared for the wavelength multiplex recording at the same position. When the phase code multiplex recording process is carried out, the SLM for modulating the reference light is further required in the apparatus shown in FIG. 1. Further, when the wavelength multiplex recording process is carried out, a plurality of laser light sources having different wavelengths are further required.

The present invention is not limited to the above-described embodiments. It is to be understood that various kinds of changes may be made within a scope of the invention defined in claims and they may be included in the present invention.

For instance, in the above-described embodiments, the noise pattern detected in each of pages is recorded in the page together with the data to be originally recorded. However, the noise pattern detected in each of the pages maybe concentrically recorded in a prescribed area of the holographic memory separately from the data to be originally recorded.

Further, in the above-described embodiment, the transmission type holographic memory is used as an example. However, a reflection type holographic memory may be employed. In that case, it is to be understood that the structure of the entire part of the holographic system needs to be suitably changed.

Further, in the above-described embodiments, the noise of the reproduced image is removed in accordance with a difference calculation that the noise pattern obtained by previously multiplying the noise pattern by a constant number (α times) is subtracted from the reproduced image. In this case, α may be a common value to all the media. α maybe a constant (group) optimized in accordance with a position in the media, the angle of incidence of the signal light or the reference light, a phase code or the like. Further, not only the simple difference calculation, but also any of functions based on the noise pattern such as a high order expression, an exponential function, a logarithmic function, a trigonometric function, etc. may be employed.

What is claimed is:

1. A holographic recording and reproducing apparatus in which a signal light and a reference light are applied to a holographic memory to record data as the interference pattern of the light and the data is reproduced from a reproduced image obtained by applying the reference light to the holographic memory; the holographic recording and reproducing apparatus comprising:
    a noise pattern detecting unit for detecting a noise pattern in a prescribed page of the holographic memory;
    a noise pattern storage unit for storing the noise pattern;
    a data reproducing unit for reading the reproduced image from the prescribed page of the holographic memory; and
    a noise removing unit for removing a noise component from the reproduced image by using the noise pattern previously detected by the noise pattern detecting unit.

2. A holographic recording and reproducing apparatus according to claim 1, wherein the noise pattern storage unit includes an external storage device for storing data therein.

3. A holographic recording and reproducing apparatus according to claim 1, wherein the noise pattern storage unit includes a noise pattern recording unit for recording the noise pattern on the holographic memory.

4. A holographic recording and reproducing apparatus according to claim 1, wherein the noise pattern detecting unit includes:
    a signal light applying unit for applying the non-modulated signal light to the prescribed page of the holographic memory;
    a light receiving unit for receiving the signal light that passes through or is reflected on the holographic memory; and
    a noise pattern processing unit for compressing the noise pattern from the light receiving unit.

5. A holographic recording and reproducing apparatus according to claim 4, wherein the noise pattern storage unit includes a noise pattern recording unit for recording the noise pattern on the holographic memory.

6. A holographic recording and reproducing apparatus according to claim 1, wherein the noise pattern recording unit records the noise pattern detected in each page of the holographic memory in the page together with data to be originally recorded.

7. A holographic recording and reproducing apparatus according to claim 1, wherein the noise pattern recording unit concentrically records the noise pattern detected in each page of the holographic memory in a prescribed area of the holographic memory separately from the data to be originally recorded.

8. A holographic recording and reproducing apparatus, according to claim 1, wherein the noise pattern detecting unit detects the noise pattern by a gray scale.

9. A holographic recording and reproducing apparatus according to claim 1, wherein when the noise pattern detecting unit sequentially detects the noise patterns respectively in the pages of the holographic memory, the noise pattern detecting unit detects the noise patterns at intervals of prescribed pages.

10. A holographic recording and reproducing apparatus according to claim 9, wherein when the data reproducing unit reproduces data on a page in which the noise pattern is not recorded, the data reproducing unit removes a noise component from the reproduced image by using a noise pattern obtained by performing an interpolating process using the noise patterns of the pages before and after the page.

11. A holographic recording and reproducing apparatus according to claim 10, wherein when a plurality of data is recorded in the same place by a phase code multiplex recording or a wavelength multiplex recording, the noise removing unit removes the noise component from the reproduced image by using a noise pattern common to each of the data.

* * * * *